April 21, 1942.　　D. J. BARRETT, JR., ET AL　　2,280,465
RADIO RECEIVER
Filed Sept. 11, 1940　　2 Sheets-Sheet 1
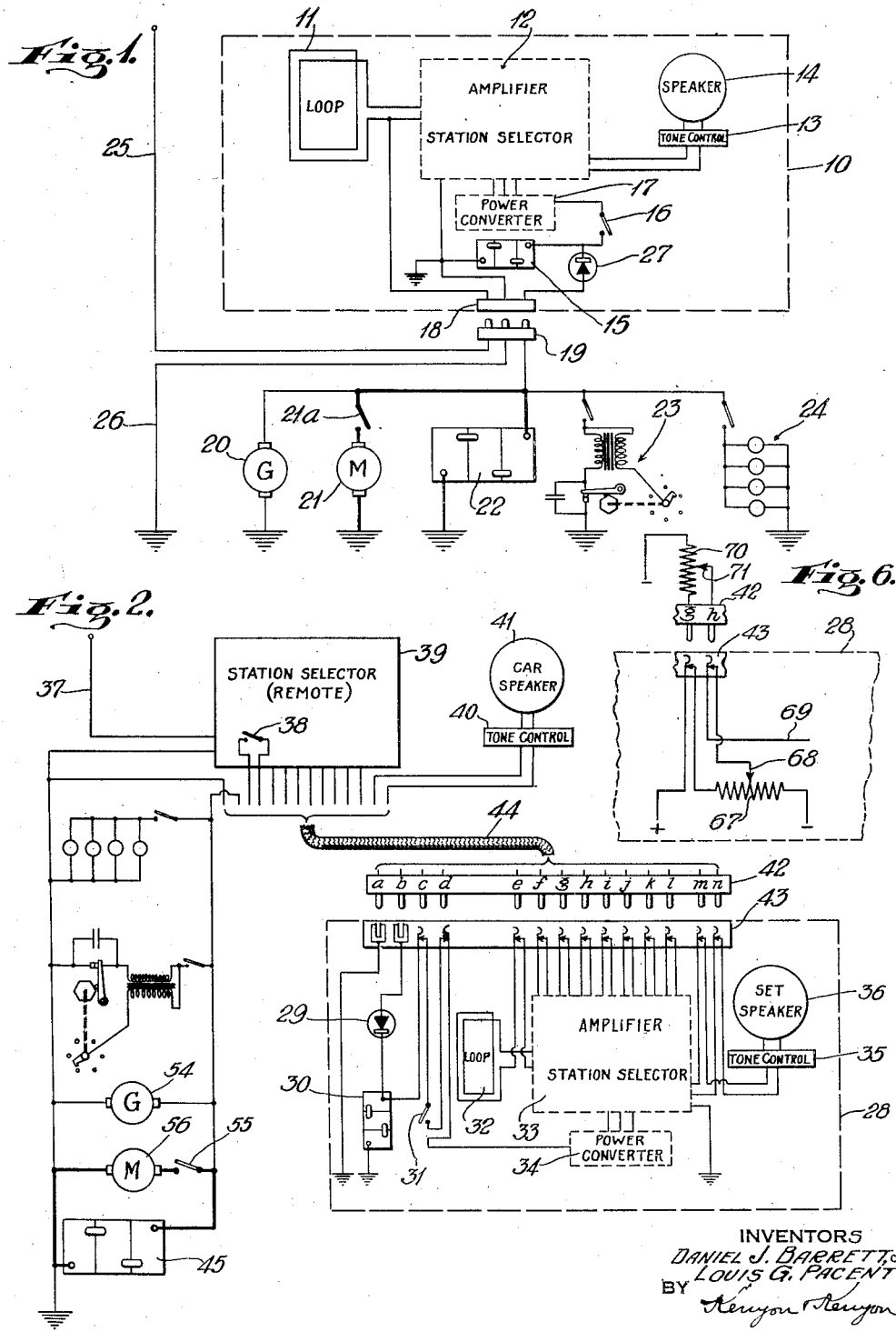
INVENTORS
DANIEL J. BARRETT, JR.
LOUIS G. PACENT
BY Kenyon & Kenyon
ATTORNEYS April 21, 1942.  D. J. BARRETT, JR., ET AL  2,280,465
RADIO RECEIVER
Filed Sept. 11, 1940  2 Sheets-Sheet 2

INVENTORS
DANIEL J. BARRETT, JR.
LOUIS G. PACENT
BY
Kenyon & Kenyon
ATTORNEYS

Patented Apr. 21, 1942

2,280,465

UNITED STATES PATENT OFFICE 2,280,465

RADIO RECEIVER

Daniel J. Barrett, Jr., Mount Vernon, and Louis G. Pacent, New York, N. Y.; said Pacent assignor to said Barrett, Jr.

Application September 11, 1940, Serial No. 356,246

4 Claims. (Cl. 250—27)

This invention relates to radio receiving sets adapted to operate either when connected to an external source of power or disconnected therefrom, and to such sets adapted to be tuned, switched and actuated alternatively from one or another control board or panel. The chief application of our invention now apparent to us is the provision of a radio receiver which may be inserted in a holder in an automobile or other internal combustion operated vehicle, motor boat or the like and there controlled directly or from a remote control panel, or which may be carried about as a portable receiver, and whose battery will be recharged while the set is in the vehicle and at the same time will be protected against drainage into the electrical circuits of the vehicle.

At the present time, there are in use radio receiving sets which are directly and permanently connected to the electrical circuits of an automobile; and there are also in use portable radio sets which have a self-contained power source and require no connection with outside circuits. The former can, of course, be controlled only within the automobile in which it is installed, and heard only within a small distance thereof. The latter is subject to the disadvantage that the dry cells which furnish respectively the currents of low, intermediate and high voltage that are required, must be replaced rather frequently, especially if the receiver is in constant use. The cost of replacing these batteries is, at the present time, so high as to make use of so-called portable radios inconvenient and expensive.

An object of the present invention is to provide a radio set which will have the convenience of portability and which, for instance, can be carried into a home which is not wired for electricity, together with the convenience of efficient reception in an automobile and the convenience of being powered from a battery that is recharged whenever the car runs.

Further objects of the invention are to provide circuits and electrical instrumentalities which permit a portable radia set at will to be interconnected with the circuits, including the charging circuits, of an automobile or other vehicle whereby the battery of the radio set is re-charged while the car is running, permitting the radio set to be removed at will from the car and to operate upon its own self-contained battery during the time it is disconnected from the car circuits.

A further object of the invention is to provide means for protecting the radio circuits from injury because of the interconnection thereof with the car circuits.

In the drawings forming part of this specification, we have shown three alternate types of circuit arrangements permitting accomplishment of the end in view.

A fourth method, which will be clearly apparent from the other methods shown, is set forth in this specification, but without circuit diagrams.

Fig. 1 shows circuit arrangements, in accordance with our invention, when the removable radio unit is intended to be inserted into an appropriate holder in the car at or under the dashboard, so that the controls of the set are within reach of the driver.

Fig. 2 shows circuit arrangements, in accordance with our invention, in an alternate arrangement wherein the removable radio unit is adapted to be inserted into a holder in the car which is remote from the driver's reach, for example, in the trunk compartment at the rear.

In this embodiment of our invention, a duplicate remote station selector panel, together with duplicate "on-off" switch and tone control are located within the reach of the driver on the instrument panel. In this form, the station selector controls of the duplicate remote unit are cut into the respective circuits by the plugging in of the multi-jack.

Figure 3:
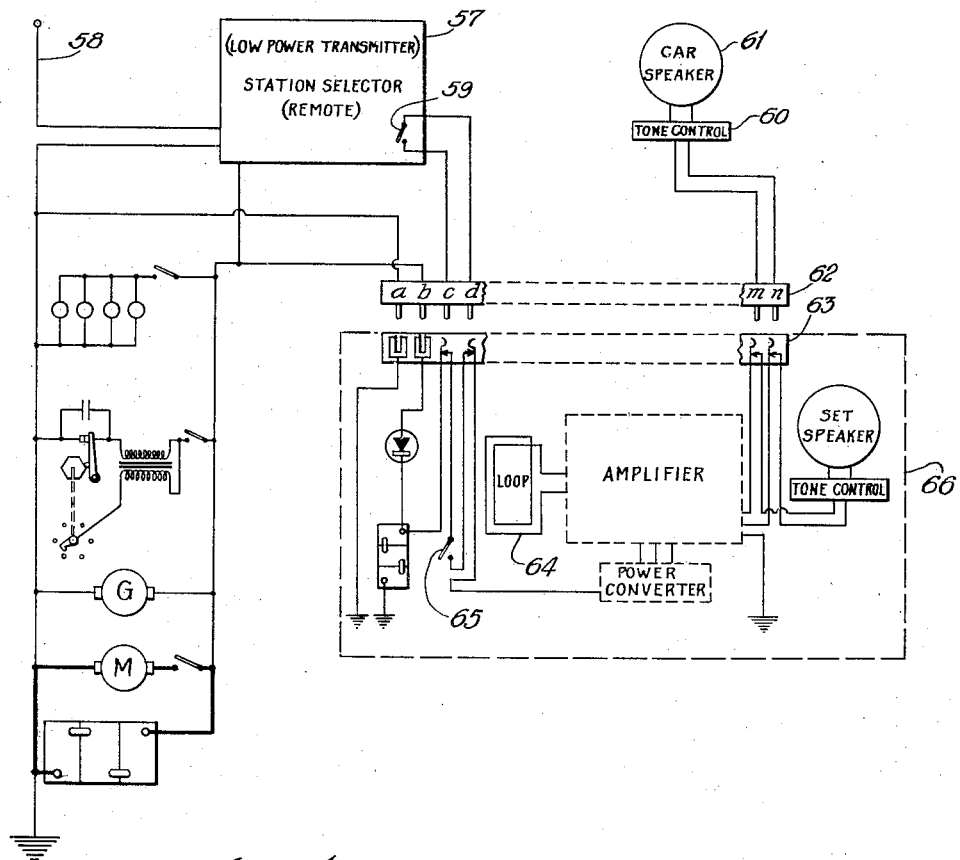

Fig. 3 shows the circuits, in accordance with our invention, which are used when the portable radio unit is inserted in a holder in the car at some point remote from the driver's reach such as the trunk compartment in the rear and means are then afforded through the use of a low power transmitter whose controls are positioned on the car instrument panel, within easy reach of the driver, to make the station selection at the instrument panel, and to transmit the signal on a fixed frequency, just below the broadcast band, which is propagated by the low power transmitter at the instrument panel and received by the portable receiving set positioned elsewhere in the automobile and is by it amplified and fed to the car loudspeaker.

Figure 4:
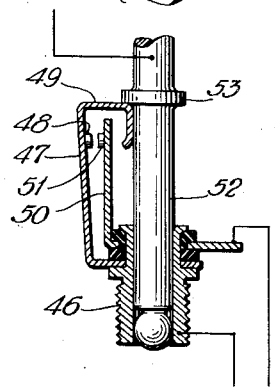
Figure 5:
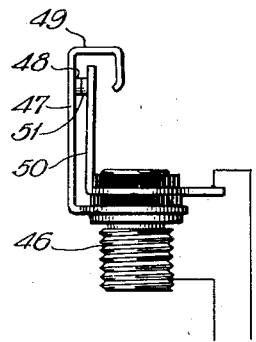

Figs. 4 and 5 show details of one form of jack, adapted to be used in connection with certain forms of this invention.

Fig. 6 illustrates the circuit arrangements whereby a control element, in this case a variable rheostat, may be duplicated in the remote control unit for alternative use while the set is positioned in its holder in the car.

1. *Controlling the portable set, while it is in the car, by its own controls*

Referring to Fig. 1, the parts enclosed within dotted line 10 are physically mounted or assembled upon the frame or chassis of a portable radio receiving set. This set comprises a loop antenna 11 feeding into a radio detector and amplifier 12 of suitable design, a tone control unit 13 and speaker 14. The power is supplied by a battery 15 of a type which is capable of being re-charged and is at the same time spill-proof. For this purpose, we prefer to employ a lead-acid type of storage battery, the kind now commonly used in miners' lamps. In order to afford a better quality of reception, and to permit this battery to receive a charge simultaneously with the automobile battery, the set battery 15 should have approximately the same voltage rating as the car battery 22 hereinafter referred to. Battery 15 is connected at its negative terminal to the set ground and at its positive terminal through the "on-off" switch 16 to a suitable power converter unit 17. To obtain the necessary high voltage for the plate supply, we use a vibrator pack of the type common in automobile radios, thereby generating alternating current which is stepped up to the desired voltage in a transformer and thereafter rectified. Direct current of lower voltage than that delivered by the battery can be obtained in the usual fashion by tapping an intermediate point on a resistance. As these details are not new, we refer to them briefly merely to show the general nature of the apparatus comprising the power converter 17. As thus far described, the portable radio unit is completely self-sustaining wherever it may be so long as the battery 15 is not exhausted. It is complete with its own manual controls for station selection, "on-off" switch and tone control.

Associated with this portable set is a multi-plug panel 18 adapted, in this instance, to receive the male members of the multi-plug 19. Panel 18 is conveniently located in some external face of portable radio set 10, where the multi-plug 19 may be conveniently inserted when the radio set is in place in an appropriate receptacle or holder in the car. If desired, the arrangement of radio receptacle and plugs may be such that when the set is inserted into its receptacle and pushed to its home position, the male members of multi-plug 19 will engage with the respective sockets of the panel 18.

In the form of apparatus herein described, multi-plug 18 is provided with three plugs insulated from each other. These are adapted to be connected, respectively, with the three wires forming a part of the car circuit, now to be described. The standard car circuit includes a generator 20 driven by the engine of the car, starting motor 21, starting switch 21a, a car battery 22, ignition circuits 23, and lighting circuits 24.

The three male members of multi-plug 19 are connected respectively to the car aerial 25, the car ground 26 and the positive terminal of car battery 22.

In order to protect the set battery 15 from undue drainage upon the closing of starting switch 21a, which would otherwise expose the set battery of relatively small size to loads far in excess of its capacity, there is interposed in the circuit between the positive terminal of car battery 22 and the positive terminal of set battery 15, a unilateral valve 27. Preferably, the valve 27 is interposed in a circuit connecting the wire which joins the positive terminal of set battery 15 and "on-off" switch 16 with that female member of panel 18 intended to be connected to the positive terminal of car battery 22. Valve 27 is faced in such a direction that current may flow from generator 20 to set battery 15 through valve 27, but valve 27 prevents the flow of current from battery 15 to starting motor 21 when the voltage of car battery 22 falls below that of the set battery, as for example, when starting switch 21a is closed.

Valve 27 may be any one of a number of different types of rectifiers, such as a copper oxide or sulfide rectifier, a tantalum or selenium rectifier or any of the types of thermionic rectifiers.

In the arrangement herein disclosed, when the portable radio set is positioned in a suitable holder in the automobile, and the multi-plug 19 has been inserted in the multi-plug panel 18, the radio set may then be used for radio reception during operation of the automobile. At this time, it will receive its signal through the car aerial 25 and its grounding connections will be carried out to the car ground 26. At the same time, the set battery 15 will be charged when the engine is running and whether or not there is power left in the set battery 15 when the set is inserted into the automobile, the radio circuits will receive power during the time the set is in the car from the car batery 22.

In the arrangement above described, it is intended that the "on-off" switch, station selector, volume control and tone control knobs of the radio set itself shall be within easy reach of the driver or other occupant of the car, when the set is in its place in the car. It is also contemplated that the output of the set shall be through its own speaker.

2. *Controlling the portable set, while it is in the car, by a remote duplicate station selector unit*

In the arrangement shown in Fig. 2 of the drawings, it is contemplated that the portable radio unit, when inserted in its appropriate holder in the car, shall be at some point remote from the reach of the driver or other occupant of the car as, for example, in the trunk compartment at the rear of the car. The advantage of such an arrangement lies in the ability to make the radio set itself more secure against theft and because such arrangement permits the use of a radio set of larger size and larger amplifying power than could conveniently be inserted under the instrument or panel dashboard of an automobile.

In the arrangement here described, the dotted line 28 represents the chassis or frame upon which are mounted a unilateral valve 29, set battery 30, set "on-off" switch 31, set loop 32, amplifier and set station selector 33, power converter 34, tone control 35 and set speaker 36.

In this case, certain elements of the portable radio unit 28 are duplicated in the apparatus permanently mounted upon the car. The latter includes a car antenna 37, car "on-off" switch 38, car remote station selector unit 39, car tone control unit 40 and car speaker 41. The controls of the car station selector unit 39, car "on-off" switch 38 and car tone control unit 40, are conveniently arranged within easy reach of the driver or some other occupant of the car, preferably on the instrumental panel on the dash. The car speaker 41 may be located anywhere within the car.

In this arrangement, a multi-plug jack 42 is adapted to engage with a series of receiving sockets and switches arranged in a panel 43 forming a part of set 28. The several male plugs of jack 42 are connected through a multi-conductor cable 44 with the electrical elements of the car hereinafter mentioned.

For convenient description, the plugs associated with the jack 42 have been lettered from *a* to *n* inclusive on Fig. 2 and will be referred to by those letters here.

The arrangement is such that when the radio set is inserted in its receptacle or other holder in the car, the multi-plug jack 42 may then be inserted in the panel 43 as a separate operation or the design and fit of the parts may be such that when the portable set is in its holder and is moved to its home position, the engagement of plugs of the jack 42 with the sockets of the panel 43 is automatically established.

The exact number of plugs in jack 42 will depend upon the nature and character of the circuits contained in the radio set.

Plug *a* is connected to the car ground and socket *a* is connected to the set ground, thus grounding the chassis or frame of the set on the chassis or frame of the car when the connections have been made.

Plug *b* is connected to the positive terminal of car battery 45 and socket *b* is connected through uni-lateral valve 29 to the positive terminal of set battery 30. These connections are similar to the corresponding ones shown in Fig. 1.

Plugs *c* and *d* are connected with the car "on-off" switch 38. Within panel 43 is mounted a switch mechanism intended to co-operate with plugs *c* and *d*, which is shown in greater detail (one possible form thereof) in Figs. 4 and 5. Referring to this switch mechanism: Externally threaded sleeve 46 is mounted within the panel 43. It carries two spring switch members. Spring switch member 47, which is electrically connected to sleeve 46, is bent upwardly (see Fig. 4) and near its upper end carries a contact member 48 and a projecting knuckle 49. Spring switch member 50 is mounted upon sleeve 46, but electrically insulated therefrom. Near its upper end it carries a contact member 51. As plug 52 enters sleeve 46, its upper portion makes contact with knuckle 49 and moves the same to the left as seen in Figs. 4 and 5, thus disengaging contacts 48 and 51. Plug 52 is provided with a flange 53 which engages knuckle 49 to limit further inward movement of plug 52. The removal of plug 52 from sleeve 46 as shown in Fig. 5 permits spring switch member 47 to move until contacts 48 and 51 are in engagement.

The foregoing switch mechanism may be in any one of several forms, that shown in Figs. 4 and 5 being for purposes of illustration only. The corresponding mechanism where it appears in Figs. 2 and 3 is indicated generally by a conventional symbol.

Plugs *c* and *d* co-operate with corresponding switch mechanisms interposed on each side of set "on-off" switch 31. Plug *c* and *d* in turn are directly connected to each side of car "on-off" switch 38. The arrangement is such that when plugs *c* and *d* are thrust into their home positions, and switch contacts 48, 51 are thus opened, the power supply to the set 28 is wholly controlled by the car "on-off" switch 38, and the set "on-off" switch 31 is no longer in circuit.

Plugs *m* and *n* are connected respectively to the input side of the car tone control unit 40. Plugs *m* and *n* co-operate respectively with switching mechanisms similar to that previously described. Said switches are interposed in the output circuit of the amplifier 33, as shown in Fig. 2, and the arrangement is such that when plugs *m* and *n* are thrust into their respective home positions, the signal output of amplifier 33 feeds direct to car tone control unit 40 and thus to the car speaker 41. When plugs *m* and *n* are withdrawn from engagement with the corresponding opposed switching elements, the signal output of amplifier 33 passes through these closed switches to the tone control 35 and speaker 36 within the radio set.

Plug *e* is connected with the car aerial 37 and co-operates with a switching mechanism similar to that previously described which is interposed in the circuit leading from the set loop 32 to the radio detector stage of the set amplifier 33. Thus, the arrangement is such that when plug *e* is seated in its home position, the co-operating switch is opened and signals received on the car antenna 37 and the set loop 32 are fed to the first stage of radio detection. On the other hand, when the plug *e* is removed and the co-operating switch mechanism is thereby closed, the signal is received solely through the set loop 32. By using two plugs and two switches with appropriate connections, as will be obvious in view of the previous description, signals received on the car antenna 37 alone may be fed to the first stage of radio detection while these plugs are seated in home position.

Plugs *f*, *g*, *h*, *i*, *j*, *k* and *l* co-operate respectively with opposed switching mechanism similar to what has already been described. These plugs are connected respectively to duplicate manually-operated condenser and rheostat controls in the car remote station selector unit 39. For illustration we show in Fig. 6 how a variable rheostat control may be duplicated. A constant potential is maintained across resistance 67 within the set so long as switch associated with plug *g* remains closed. A movable contact element 68 draws the desired potential from an intermediate point of this resistance to line 69 through switch elements associated with plug *h* when this switch is closed. Upon insertion of plugs *g* and *h* into their respective sockets, these switches are opened. Thereupon duplicate resistance 70 positioned in the remote control unit 39 is energized in lieu of resistance 67, and duplicate movable contact member 71 will then draw the desired potential from an intermediate point of resistance 70 to the line 69 by reason of the engagement of plugs *g* and *h* with their respective sockets. In like manner tuning condensers and other manual control elements may be duplicated, and control of the tuning of the receiver may thus be passed to the duplicate tuning condensers and other remote control elements while the plugs are engaged in their respective sockets and the socket switches are open.

The remote control unit preferably contains one stage of radio frequency amplification and the pentagrid converter stage constituting the tuner circuits, and also incorporates a volume control, both duplicating corresponding elements within the radio set. The unit 39 is permanently mounted on the dashboard of the automobile. The number of plugs and co-operating switches which will be required depends somewhat upon the design and wiring circuits of set 28. Corresponding elements are included in the radio set 28, but in each case the connections of corresponding elements within the radio set 28 pass through one of the switching elements in panel 43 corresponding to the plugs last mentioned and the corresponding plug in each case is connected with the duplicating element in the remote station selector unit 39. Thus, when plugs f, g, h, i, j, k, l, etc. have been brought to their home positions in relation to their respective opposed switching mechanisms, all tuning and amplification output of amplifier 33 comes under the control of station selector and volume knobs associated with the station selector unit 39. When these plugs are removed from their respective home positions, such that the corresponding opposed switches are closed, control of the tuning and volume output of amplifier 33 is then returned by the closing of these switches to the station selector and volume control knobs forming a part of radio set 28.

When the multiple plug jack 42 is in its home position with respect to the sockets and switches on the panel 43, the car generator 54, through plug b and unilateral valve 29 will deliver charge to set battery 30. At the same time, should starting switch 55 be closed while the plugs are in home position, so as to energize starting motor 56, set battery 30 will be protected against discharge through motor 56 by the high resistance of valve 29 tending to prevent a flow of current in that direction.

3. Controlling the portable set while it is in the car by a low power transmitter In Fig. 3 is shown an alternate form of device for effecting control of the radio while it is in the car from a panel within easy reach of the driver even though the radio itself be located in some inaccessible part of the car such, for example, as the trunk compartment in the rear.

In this arrangement, the portable set 66 is similar to the set 28 previously referred to, except that it lacks the switching mechanism interrupting the various amplifying circuits, these being the switches associated with plugs e to l inclusive. Accordingly, the set 66 need not be further described in detail. Its circuits, so far as material, are shown by conventional symbols in Fig. 3.

In this case, there is built into some accessible part of the car, preferably the instrument panel of the dashboard, a remote station selector unit 57, receiving the station signal through car antenna 58. Preferably associated with unit 57 is the car "on-off" switch 59. Also within reach of the driver or other occupant of the car is a duplicate tone control unit 60 and a car speaker 61.

Multi-plug jack 62 may be provided with six plugs, herein identified by the letters, a, b, c, d, m and n. Through a suitable multi-conductor cable, these plugs are connected to the car circuits and elements in the manner hereinafter mentioned. In some external face of set 66 is panel 63 containing sockets and switches similar to those in panel 43 previously described but fewer in number as hereinafter pointed out.

The functions of plugs a, b, c, d, m and n and their related circuits and elements are similar respectively to those described in connection with plugs a, b, c, d, m and n in connection with Fig. 2 above and need not be here repeated.

In the form of device herein described, the jack 62 need have only the six plugs hereinabove mentioned.

The remote station selector unit 57 comprises the usual detector tubes and circuits, together with tuning condensers for station selection. The plate circuit of the second IF stage instead of being coupled to the usual second detector and output stages, is terminated in a large tank coil which is resonated to a predetermined IF frequency. The frequency selected is preferably a little below the broadcast band. Thus, the broadcast program which is selected by the manually-operated tuning condensers, is in effect rebroadcast at very low power from the tank coil on a frequency below the broadcast band and with sufficient power only for the purpose indicated. The signals radiated by the tank coil are thus received by loop 64 of radio set 66.

In the arrangement here disclosed, the radio set at the time it is inserted in its holder in the automobile is tuned to the frequency radiated by the tank coil and its volume control is left at its maximum setting. As previously explained, the power supply of radio set 66 is integrated with the electrical system of the car and the functions of set "on-off" switch 65 are, through plugs c and d, transferred to car "on-off" switch 59. Tone control is likewise transferred to the car tone control unit 60 and the output of the set is delivered through car speaker 61. Thus, tuning and volume, while set 57 is in its holder in the car, is under the control of the station selector and volume knobs of the remote station selector unit 57 positioned on the dashboard of the car. During this period of time, the radio set 66 as a whole remains tuned to the sub-broadcast frequency of the low powered transmitter (tank coil) associated with unit 57. When the radio set is lifted out of the car and the plugs associated with jack 62 are disengaged from the panel 63, set 57 is complete and self-sustaining and may be carried about and used as any portable radio, its battery having been re-charged while it was in the car and the car generator was running.

4. Controlling the portable set, while it is in the car, by mechanical means It is also within the purview of this invention to control mechanically the tuning and switching elements of a radio set which, when it is in position in the car, is remote from the driver or other occupant of the car. In this case, the arrangement is similar to that described in connection with Fig. 3 of the drawings, except that means are provided through a flexible cable for interconnecting the shafts of the respective tuning condensers and rheostats within the radio set to appropriate duplicate knobs mounted on the dashboard of the car or within easy reach of its occupant. Such flexible cable will include a mechanical coupler of suitable form to permit connecting and disconnecting of the means by which mechanical power is transmitted from the duplicate control panel on the dashboard of the car to the movable elements within the radio set. With this form of device, there is used a multi-plug jack and multi-conductor cable preferably containing the connections which are mentioned in connection with the description given of the circuits of Fig. 3. In this way, the battery of the radio set will be re-charged from the car generator while the set is in the car and the generator is delivering current; the "on-off" switch on the car dashboard will control the power supplied to the tubes of the set and the output of the set will be delivered through a duplicate tone control unit, whose controls are within easy reach of the driver of the car and thence to the car speaker.

By the means just described, it is possible to bring radio of good quality to the home which does not have electrical power without the bother or expense of re-charging storage batteries or of purchasing replacement dry cells. The radio set may be kept in the home during the evening. During the daytime, it may be inserted in its holder in the car and appropriate connections made so that, as the car is driven during the day, the said battery is re-charged from the car generator.

In each of the forms of radio sets herein described, there should be included proper filters to eliminate noises originating in the spark plugs or elsewhere in the automobile.

While we prefer to employ a rectifier for protection of the set-battery from drainage into the car circuits, it is also possible to accomplish at least a partial protection of the set battery by a relay which opens when the flow of current from the set battery exceeds a predetermined amount. Because of mechanical lag in the operation of such a device we prefer to use a rectifier of one of the types mentioned above.

It is also within our intention that the portable set may be arranged to receive either frequency modulation or audio modulation, the connections and means employed for realizing our invention being modified accordingly in a manner which will be obvious from the description previously given. If desired, tone compensation circuits may be employed and suitably duplicated, so far as necessary, in the remote control unit mounted on the dashboard of the car.

While reference has been made herein chiefly to a car or automobile, we employ the term "automotive vehicle" in the subjoined claims to refer broadly to any vehicle capable of moving on land or water or in the air, which possesses its own electrical system comprising load circuits other than radio circuits, and in which a storage battery or other source is available to energize such system. We believe and intend our invention to be applicable in connection with automobiles, trucks, trailers, boats, airplanes, military vehicles and the like, but without limitation to the particular vehicles or classes of vehicles here mentioned.

The voltage rating of the set battery should preferably be approximately the same as the voltage rating of the car battery, so that the generator will properly maintain the charge in each when the radio receiver is connected with the car electrical system. If it is desired to have the set battery of substantially less voltage rating than the car battery, a resistance of appropriate value may be connected in series with the unilateral valve to equalize the distribution of charge between the two batteries.

We do not intend that our invention shall be limited to the specific forms herein set forth and described, but that it shall be held to comprise all that which is set forth within the subjoined claims.

We claim:

1. In a motor driven vehicle having an engine, an electrical system including a vehicle storage battery, load circuits, and a generator driven by said engine for charging said battery, a removable self-contained radio receiving set including a set storage battery, means for electrically connecting said set in circuit with said generator to cause both the set battery and the vehicle battery to receive charging current from said generator when said engine is operating, and unilateral conducting means forming a part of said set and removable with it for permitting flow of charging current from said system to the set battery but opposing reverse flow.

2. In a motor driven vehicle having an engine, a starting motor for the engine, a vehicle storage battery, load circuits, and a generator driven by said engine for charging said battery, a removable self-contained radio receiving set including a set storage battery, a receiving antenna on said vehicle, plug and socket means for electrically connecting said set in circuit with said generator and said antenna to place said antenna in circuit with the input of said receiving set and said set battery in charging relation to said generator, and unilateral conducting means forming a part of said set and removable with it for permitting current flow from said generator and vehicle battery to said set battery but opposing flow of current from said set battery to said starting motor.

3. In a motor driven vehicle having an engine, an electrical system including a vehicle storage battery for energizing the ignition and load circuits, and a generator driven by said engine for charging said battery, a portable self-contained radio receiving set including an aerial, an amplifier, and a set storage battery, means for detachably connecting said set in circuit with said generator to cause both the set battery and the vehicle battery to receive charging current from said generator in multiple, and for disconnecting said set including the set battery from said circuit while leaving intact all of the operative functions of the vehicle electrical system, and unilateral conducting means in circuit between the set battery and the vehicle electrical system for permitting flow of charging current from said system to the set battery and opposing reverse flow, in order to preclude current flow from the set battery to any current-consuming element of the vehicle electrical system while permitting current flow to the radio receiver.

4. In a motor driven vehicle having an engine, an electrical system including a starting motor for the engine, a vehicle storage battery for energizing the ignition and load circuits, and a generator driven by said engine for charging said vehicle battery, a portable self-contained radio receiving set including an aerial, an amplifier, and a set storage battery, a receiving antenna on said vehicle, plug and socket means for electrically connecting said set in circuit with said generator and said antenna to place said antenna in circuit with the input of said receiving set and said set battery in charging relation to said generator, said plug and socket means also serving to disconnect said set including the set battery from said circuit and antenna while leaving intact all of the operative functions of the vehicle electrical system, and unilateral conducting means in circuit with the set battery and said system for permitting current flow from said generator to said set battery and for opposing flow of current from said set battery to any current-consuming element of said vehicle electrical system.

DANIEL J. BARRETT, Jr.
LOUIS G. PACENT.